United States Patent
Bariant et al.

(10) Patent No.: US 10,643,082 B2
(45) Date of Patent: May 5, 2020

(54) METHOD FOR ASSESSING AN AFFILIATION OF A SENSING POINT TO AN OBJECT IN A SURROUNDING AREA OF MOTOR VEHICLE, AND DRIVER ASSISTANCE SYSTEM

(71) Applicant: VALEO Schalter und Sensoren GmbH, Bietigheim-Bissingen (DE)

(72) Inventors: Jean-Francois Bariant, Bietigheim-Bissingen (DE); Markus Heimberger, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 163 days.

(21) Appl. No.: 15/563,171

(22) PCT Filed: Mar. 22, 2016

(86) PCT No.: PCT/EP2016/056195
§ 371 (c)(1),
(2) Date: Dec. 28, 2017

(87) PCT Pub. No.: WO2016/156097
PCT Pub. Date: Oct. 6, 2016

(65) Prior Publication Data
US 2018/0173968 A1 Jun. 21, 2018

(30) Foreign Application Priority Data
Mar. 31, 2015 (DE) .................. 10 2015 104 937

(51) Int. Cl.
*G06K 9/00* (2006.01)
*G06K 9/62* (2006.01)
(Continued)

(52) U.S. Cl.
CPC ....... *G06K 9/00791* (2013.01); *G05D 1/0238* (2013.01); *G06K 9/00805* (2013.01);
(Continued)

(58) Field of Classification Search
CPC ............................ G08G 1/166; G06K 9/00805
See application file for complete search history.

(56) References Cited

U.S. PATENT DOCUMENTS

| 2004/0081359 A1 | 4/2004 | Bascle et al. |
| 2004/0120550 A1 | 6/2004 | Comaniciu |

(Continued)

FOREIGN PATENT DOCUMENTS

| DE | 10 2005 026386 A1 | 12/2006 |
| DE | 10 2006 049626 A1 | 4/2008 |
| DE | 10 2009 045286 A1 | 4/2011 |

OTHER PUBLICATIONS

International Search Report issued in PCT/EP2016/056195 dated Jun. 2, 2016 (3 pages).

(Continued)

*Primary Examiner* — Oneal R Mistry
(74) *Attorney, Agent, or Firm* — Osha Liang LLP

(57) ABSTRACT

The invention relates to a method for assessing an affiliation of a sensing point (12, 13, 19, 20) to an object in a surrounding area (7, 8) of a motor vehicle (1), in which the sensing point (12, 13, 19, 20) is sensed using a first sensor device (4) of the motor vehicle (1), and a fuzziness zone (14, 15) characterizing a positional fuzziness of the sensing point (12, 13, 19, 20) is formed around the sensing point (12, 13, 19, 20), wherein the assessment of the affiliation of the sensing point (12, 13, 19, 20) to the object takes into consideration at least one position of a further sensing point (12, 13, 19, 20) of the object, wherein an overall fuzziness zone (16) is formed on the basis of the fuzziness zone (14,

(Continued)

15) of the sensing point (12, 13, 19, 20), and the affiliation of the sensing point (12, 13, 19, 20) to the object is acknowledged if the sensing point (12, 13, 19, 20) and the further sensing point (12, 13, 19, 20) are situated in an area formed by the overall fuzziness zone (16). The invention also relates to a driver assistance system (2) and a motor vehicle (1).

15 Claims, 2 Drawing Sheets

(51) Int. Cl.
    *G08G 1/16*     (2006.01)
    *G05D 1/02*     (2020.01)

(52) U.S. Cl.
    CPC ........... *G06K 9/6215* (2013.01); *G08G 1/165* (2013.01); *G08G 1/166* (2013.01); *G08G 1/168* (2013.01)

(56) References Cited

U.S. PATENT DOCUMENTS

| | | |
|---|---|---|
| 2004/0208341 A1 | 10/2004 | Zhou et al. |
| 2005/0147303 A1 | 7/2005 | Zhou et al. |
| 2005/0185826 A1 | 8/2005 | Georgescu et al. |
| 2009/0121851 A1* | 5/2009 | Abe ...................... G06T 3/4038 340/435 |
| 2010/0324815 A1* | 12/2010 | Hiruta .................... G01C 21/30 701/532 |
| 2012/0170812 A1* | 7/2012 | Kamiyama ............... B60R 1/00 382/103 |
| 2013/0006419 A1* | 1/2013 | Bergstrom ........... A01D 34/008 700/245 |
| 2014/0152827 A1* | 6/2014 | Yamamoto ......... G06K 9/00791 348/148 |
| 2015/0202770 A1* | 7/2015 | Patron .................... G05D 1/024 700/245 |
| 2015/0266509 A1* | 9/2015 | Ignaczak .............. B62D 15/027 701/1 |
| 2016/0276127 A1* | 9/2016 | Gronau ................. H01J 37/222 |

OTHER PUBLICATIONS

Written Opinion of the International Searching Authority issued in PCT/EP2016/056195 dated Jun. 2, 2016 (8 pages).

German Search Report issued in DE 10 2015 104 937.6 dated Dec. 17, 2015 (8 pages).

\* cited by examiner

METHOD FOR ASSESSING AN AFFILIATION OF A SENSING POINT TO AN OBJECT IN A SURROUNDING AREA OF MOTOR VEHICLE, AND DRIVER ASSISTANCE SYSTEM

The invention relates to a method for assessing an affiliation of a sensing point to an object in a surrounding area of a motor vehicle, in which the sensing point is sensed using a first sensor device of the motor vehicle. A fuzziness zone characterizing a positional fuzziness of the sensing point is formed around the sensing point. Moreover, the invention also relates to a driver assistance system and a motor vehicle.

DE 10 2006 049 626 A1 discloses a method for determining the position and the geometric extent of an object in surroundings of a motor vehicle. The assignment of a measured value to a population of an object is performed therein using a gate method or using the Mahalanobis distance.

Furthermore, DE 10 2009 045 286 A1 discloses a method for mapping surroundings of a motor vehicle. In that case, there is provision for detected objects to be respectively described using two coordinate points and a positional fuzziness associated with the respective coordinate point. These coordinate points and the positional fuzziness are stored as data in an interface that can be accessed by the driver assistance system of the vehicle. So that the data can be used by driver assistance systems, a general object interface is necessary that can be used to describe the properties of the object.

The known methods allow the assessment of an affiliation of a sensing point only to a limited degree, which means that there is an accompanying applicable degree of inaccuracy. This is, particularly then, also disadvantageous for the actual object rating and hence also, consequently, for further statements, for example regarding a clearance between an object and the motor vehicle and/or regarding entry of such an object into a map of the surroundings. Not least, the provision of information on a cited interface in the prior art is worthy of improvement, since firstly there is only broad and fairly unspecific, fairly uncustomized, particularly in respect of further processing or forwarding, information on hand and secondly the evaluation complexity for the information that is already provided on this interface is relatively high.

It is an object of the present invention to provide a method and a driver assistance system that can be used to effect the assessment of an affiliation of a sensing point to an object in a surrounding area of a motor vehicle more accurately.

This object is achieved by a method and a driver assistance system according to the independent claims.

A method according to the invention for assessing an affiliation of a sensing point to an object in a surrounding area of a motor vehicle involves the sensing point being sensed using a first sensor device of the motor vehicle. A fuzziness zone characterizing a positional fuzziness of the sensing point is formed around the sensing point. A substantial concept of the invention can be seen as being that the assessment of the affiliation of the sensing point to the object takes into consideration at least one position of a further sensing point of the object. On the basis of the fuzziness zone of the sensing point, an overall fuzziness zone is formed. The affiliation of the sensing point to be rated to the object is then acknowledged if both the sensing point and the further sensing point are situated in an area formed by the overall fuzziness zone. This method according to the invention no longer uses only the sensing point to be assessed alone in order to attribute it to an object. Rather, a reference to another sensing point is produced in this case and, furthermore, the connection and hence the fuzziness zone of the sensing point to be rated itself are then also assessed. This combination of the sensing point with further information allows the overall fuzziness zone to be formed, which then, owing to its more complex dependency on the other information, allows a more accurate statement concerning whether the sensing point to be assessed can actually be attributed to an object or the object.

An approach of this kind therefore has substantial advantages in respect of the rating accuracy. Consequently, in this context, it is then also possible to make a more accurate statement about the detected object, for example in respect of the local position thereof and/or the extent thereof. This consequently in turn results in more accurate information being available about an object position in the surrounding area of the vehicle, which means that a driver assistance system operates in a manner more in line with demand.

Preferably, there is provision for the fuzziness zone of the sensing point to be assessed to be produced as a two-dimensionally elliptical fuzziness zone. Such a fuzziness zone with a specific shape can also indicate a certain weighting for the probability of the direction in which a positional fuzziness is greater or less. The reason is that the respective main axes of such an ellipse and the different lengths thereof consequently also prescribe different extents of the fuzziness zone in these directions. As a result, a fuzziness ellipse that is already oriented, particularly in regard to a coordinate system of the sensor device or also of the motor vehicle, is also defined.

Preferably, there is provision for a further fuzziness zone to be formed around the further sensing point. In particular, the overall fuzziness zone is also formed on the basis of the further fuzziness zone, particularly by summing the fuzziness zones. This is a particularly advantageous embodiment, since the further sensing point is therefore also not regarded as having equal points and being correct, but rather is likewise assessed with an individual positional fuzziness. As a result, the statement probability is then increased again, since the overall fuzziness zone in this regard also takes into consideration the further imponderables regarding the position of the further sensing point.

The further sensing point may preferably be a reference point or a reference sensing point for an object position, particularly a sensing point affiliated to the object.

In one advantageous embodiment, the further fuzziness zone is also produced as a two-dimensionally elliptical fuzziness zone. The advantages—already cited in regard to the aforementioned advantageous embodiment—of an elliptical fuzziness zone around the sensing point that is in particular to be assessed also apply in this case.

When a fuzziness zone of this kind is considered in three-dimensional space, a zeppelin-shaped geometry is thus obtained.

In one advantageous embodiment, the fuzziness zone and/or a further fuzziness zone produced around the further sensing point have their shape adapted on the basis of the location of the sensing points in relation to the overall fuzziness zone. Hence, the accuracy of the positional fuzziness is increased, since the change in size and/or the change in the orientation of at least one fuzziness zone allows the statement precision for the positional fuzziness to be increased and therefore the statement regarding the affiliation of a sensing point to be assessed to an object is also clarified.

Preferably, the adaptation of at least one fuzziness zone is performed according to at least one first affiliation statement. A tiered or multilevel affiliation assessment of this kind achieves a further increase in the statement precision especially in respect of the assessment of an affiliation of a sensing point to an object.

Preferably, the affiliation of the sensing point to the object is assessed by virtue of a covariance matrix being formed on the basis of a distance between the sensing points and a Mahalanobis distance being produced on the basis of the covariance matrix. Such a method specification allows a relatively simple and robust rating cycle to be installed that leads to accurate statement results.

Preferably, a check is performed to determine whether the Mahalanobis distance is less than a prescribed gate value, particularly a gate value of 1. In the event of the Mahalanobis distance being less than this prescribed gate value, and the two sensing points being situated within the overall fuzziness zone, the sensing point is assessed as being affiliated to the object. By virtue of this gate value being prescribed particularly at this specific number 1, it is a particularly simple and low-complexity matter to rate the computation of the positional fuzziness of the assessment that thus then follows for the affiliation of the sensing point to the object, and this then also still has a sufficiently high probability of being able to be regarded as accurate or correct.

Preferably, a check is performed to determine whether the Mahalanobis distance is less than a prescribed gate value, particularly a gate value of 1, and, in the event of the Mahalanobis distance being less than the prescribed gate value, it is recognized that the covariance matrix has been chosen to be too large, in which case the covariance matrix is reduced, in particular.

Preferably, the sensing point and the further sensing point are associated or combined to form a fused sensing point if the two sensing points are situated in the area of the overall fuzziness zone. This produces effectively a common representative central sensing point or focal sensing point.

Preferably, at least one fuzziness zone has its shape and/or orientation adapted if the Mahalanobis distance of an affiliation assessment is greater than the gate value, particularly the gate value 1. In this development, the reason is that it is then assumed that the lack of accuracy in respect of the positional fuzziness achieved and then also the probability statement for the affiliation of the sensing point to the object is still too low and this particularization with this additional advantageous method step then clarifies or increases precisely these statement probabilities.

Preferably, at least one fuzziness zone is adapted if, in one assessment scenario, a number N of affiliation assessments for sensing points with respect to an object is greater than a threshold value, the number N having respectively been assessed with a Mahalanobis distance greater than the gate value. Therefore, in a scenario for affiliation assessments, if an undesirably high number and hence an undesirably high percentage of the sensing points and therefore also of the affiliation statements is greater than this gate value, there is not a sufficiently desired high probability of being able to assess the affiliation of the sensing point to the object. So as then to improve or increase this accordingly, this advantageous further step of the method according to the invention counteracts precisely this and achieves the effect that a sufficiently high number of affiliation assessments less than the threshold value then arise and therefore it is then also possible for the affiliation of the sensing point to the object to be assessed with sufficiently high accuracy.

Preferably, the surrounding area is sensed using a second sensor device that is functionally different from the first sensor device. Sensing points of the second sensor device are assessed on the basis of the affiliation assessment taken as a basis for the first sensor device. This is a particularly advantageous embodiment, since it therefore becomes possible for sensing points from two differently operating sensor devices to be able to be assessed, particularly assessed as equal, in respect of their fuzziness and consequently in respect of their affiliation to an object. Both sensor devices can therefore check or test in the same manner and the results can also be compared. Especially in the case of driver assistance systems that multiply operate on the basis of and access different sensor device information, this increases the statement about the presence of an object and/or about the position of an object in the surrounding area and/or about the extent of an object substantially. Since this advantageous embodiment means that both sensor devices particularly also check against an identical gate value, particularly a gate value 1, it is now also possible to rate different sensor devices using one and the same detection results assessment scenario.

Preferably, the affiliation assessments of the two sensor devices are compared and a statement accuracy of at least one sensor device is rated on the basis thereof.

Preferably, the object characterized by affiliated sensing points is entered into a map of the surrounding area of the motor vehicle. In a further advantageous embodiment, this map of the surrounding area is then displayed on a display unit of the motor vehicle.

When a driver assistance system is a parking assistance system, for example, it is then possible for this map of the surrounding area to be displayed on the display unit so as to be visible to a vehicle occupant and for it to be perceived where objects are situated.

The invention also relates to a driver assistance system having at least one first sensor device and an evaluation unit. The driver assistance system is configured to carry out a method according to the invention or an advantageous development thereof.

Furthermore, the invention also relates to a computer program product that is configured to carry out a method according to the invention or an advantageous development when the computer program product is executed on a programmable computer device.

The invention relates furthermore to a motor vehicle having a driver assistance system.

Further features of the invention arise from the claims, the figures and the description of the figures. The features and combinations of features that are cited in the description above and also the features and combinations of features that are cited in the description of the figures below and/or as shown in the figures alone can be used not only in the respectively indicated combination but also in other combinations or on their own without departing from the scope of the invention. Therefore, embodiments of the invention that are not explicitly shown and explained in the figures, but emanate and are producible from the explained embodiments by virtue of self contained combinations of features, are also intended to be regarded as included and as disclosed. Embodiments and combinations of features that therefore do not have all the features of an independent claim as originally worded are also intended to be regarded as disclosed.

Exemplary embodiments of the invention are explained in more detail below with reference to schematic drawings, in which.

In the figures, elements that are the same or that have the same function are provided with the same reference symbols.

Figure 1:
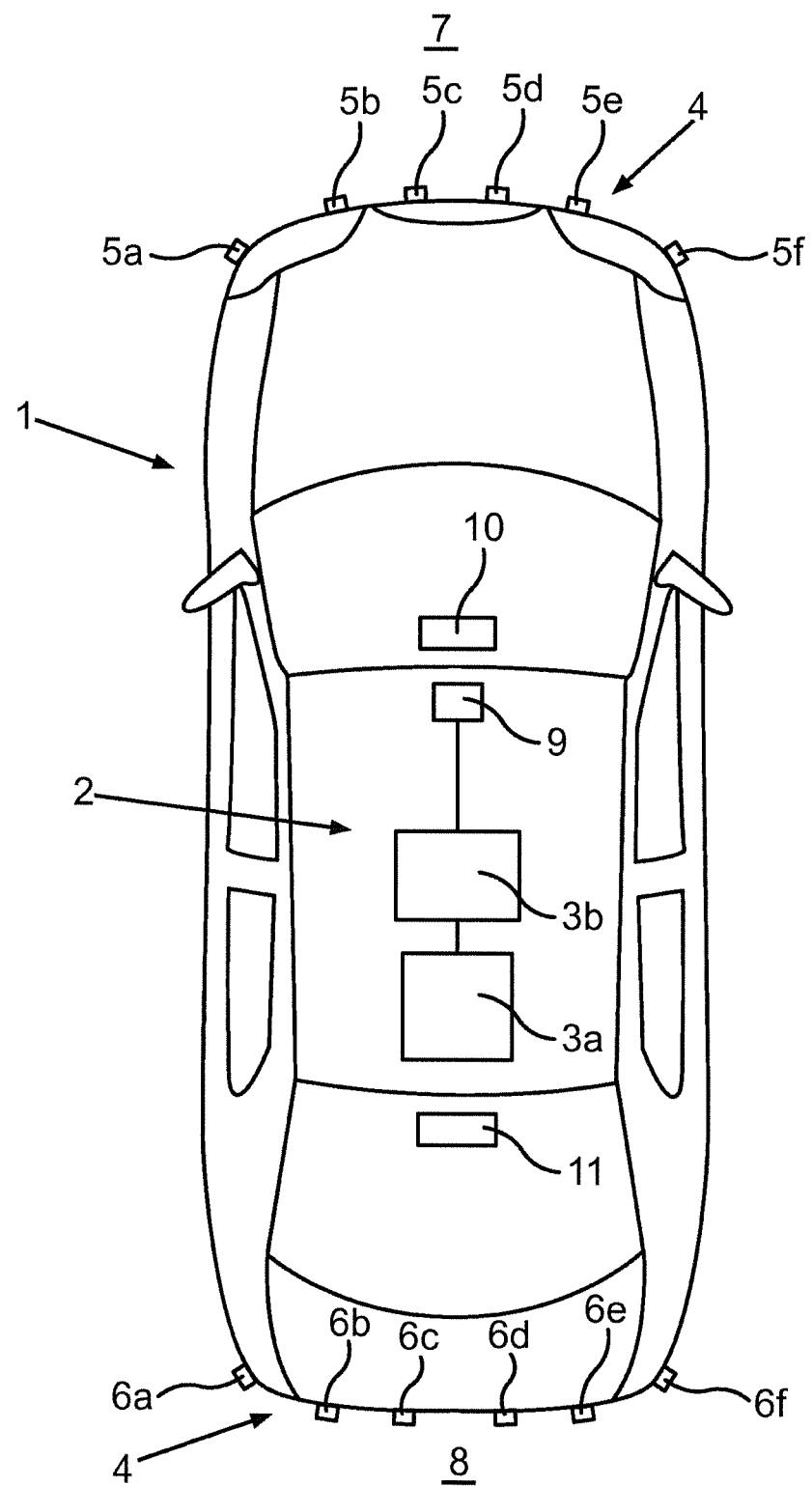
FIG. 1 shows a schematic plan view of an exemplary embodiment of a motor vehicle according to the invention with an exemplary embodiment of a driver assistance system according to the invention.

FIG. 1 shows a schematic plan view depiction of a motor vehicle 1 that has a driver assistance system 2. The driver assistance system 2 may be a parking assistance system, for example.

The driver assistance system 2 comprises an evaluation device or processing device 3 and an ultrasonic detection device 4 as first sensor device. In the exemplary embodiment, the ultrasonic detection device 4 comprises ultrasonic sensors arranged at the front of the motor vehicle 1. In this case, there are six ultrasonic sensors 5a, 5b, 5c, 5d, 5e and 5f in the exemplary embodiment. Furthermore, further ultrasonic sensors 6a, 6b, 6c, 6d, 6e and 6f are also installed in a rear area of the motor vehicle 1 in the exemplary embodiment. The front ultrasonic sensors 5a to 5f can be used to sense a front and lateral surrounding area 7. By contrast, the rear ultrasonic sensors 6a to 6f can be used to sense a rear and lateral surrounding area 8 of the motor vehicle 1. In this context, the ultrasonic sensors 5a to 5f and 6a to 6f are preferably arranged such that the entire surrounding area that is around the motor vehicle 1, and that is then composed of the surrounding areas 7 and 8, is sensed.

The motor vehicle 1 furthermore comprises a display unit 9 that can be used to provide graphical depictions. This display unit 9 can then be used to display particularly a map of the surrounding area or a map of the surroundings. In this case, the motor vehicle 1 is then also shown in this plan view depiction, for example, and the surrounding area is depicted, so that objects detected in the surrounding area 7 and/or 8 are also displayed and can be perceived by a vehicle occupant. This may be advantageous for a parking process or a backing-out process, for example.

The driver assistance system 2 makes it possible for objects that are in the surrounding area 7 and/or surrounding area 8 to be detected and also for the information obtained from ultrasonic sensors 5a to 5f and/or 6a to 6f to be able to be taken as a basis for making statements about the condition of such objects.

In particular, there is provision for the information of at least some ultrasonic sensors 5a to 5f and 6a to 6f to be processed in the processing device 3, which is particularly configured to create a map of the surrounding area.

In the exemplary embodiment, the motor vehicle 1 comprises not only the ultrasonic detection device 4, which is a first sensor device, but also at least one second sensor device, which operates in a functionally different manner from the first sensor device and, in the exemplary embodiment, is formed by a front camera 10 and/or a rear camera 11. The front camera 10 and/or the rear camera 11 likewise detect in the surrounding area 7 or in the surrounding area 8, so that they can also be used to sense objects.

Figure 2:
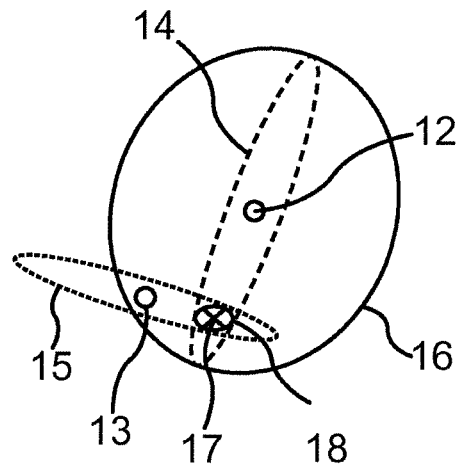
FIG. 2 shows an exemplary depiction of sensing points for the assessment in regard to the affiliation to an object.

FIG. 2 shows a schematic depiction of an exemplary scenario in which a sensing point 12 has been sensed. Furthermore, a further sensing point 13 is sensed. By way of example, these two sensing points 12 and 13 have been sensed in the surrounding area 7 using the ultrasonic detection device 4. To assess particularly the sensing point 12 in regard to the object, to which the sensing point 13 is then also affiliated, information processing in the processing device 3 forms a two-dimensionally elliptical fuzziness zone 14, representing a positional fuzziness of the sensing point 12, around the sensing point 12. Moreover, in the exemplary embodiment, a two-dimensionally elliptical fuzziness zone 15 that maps the positional fuzziness of the further sensing point 13 is also formed around the further sensing point 13.

In the exemplary embodiment, the fuzziness zones 14 and 15 are then taken as a basis for forming an overall fuzziness zone 16. In particular, this overall fuzziness zone 16 is formed from a sum of the fuzziness zones 14 and 15.

This overall fuzziness zone 16 is then formed around the sensing point 12. If both sensing points 12 and 13 are then situated in an area that is bounded by the overall fuzziness zone 16, the sensing point 12 is assessed as being affiliated to the object.

In particular, a common or fused sensing point 17 is formed from the sensing points 12 and 13, in which case a fuzziness zone 18 is preferably in turn formed around this fused sensing point 17 in this instance too. This is, as can be seen, then a distinctly smaller fuzziness zone 18, which means that the positional fuzziness of the fused sensing point 17 is low. This means that the location of said fused sensing point can already be indicated very accurately.

Therefore, the affiliation assessment particularly also involves a vector v being formed that is formed from the difference between the position vectors $\hat{x}_1$ and the position vector $\hat{x}_2$. In particular, a covariance for this difference vector v is then formed, which is then obtained as covariance S. This is defined in that it is formed mathematically from the term $E\{vv^T\}$. This is then the sum of the positions $P_1$ and $P_2$ of the sensing points 12 and 13. The Mahalanobis distance d is then determined, which is obtained from $d(\hat{x}_1, \hat{x}_2) = v^T S^{-1} v < g$. In this case, g denotes the gate value, which, in an advantageous embodiment is set as 1. If the sensing points are then situated within this gate value area and also within the overall fuzziness zone, then the sensing points are fused or associated. This then results particularly in the fused sensing point 17.

Figure 3:
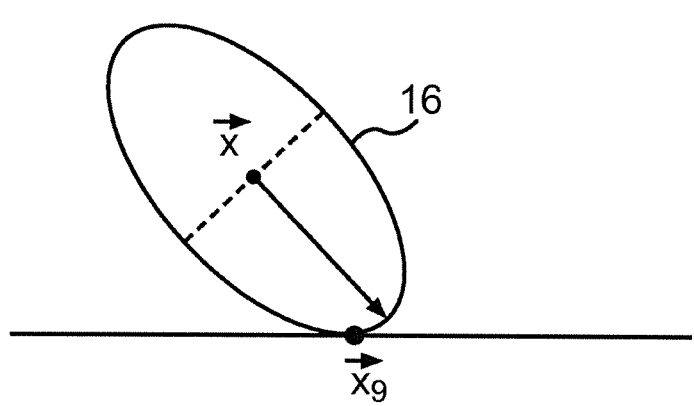
FIG. 3 shows an exemplary depiction of a positional fuzziness scenario.

FIG. 3 shows a simplified depiction of the assessment of two actual punctiform sensing points of the vectors $\hat{x}_i$ and $\hat{x}_g$. In the embodiment shown here, the sensing point with the position $\hat{x}_g$ in the case of an overall fuzziness zone 16 is situated exactly on the boundary line of the overall fuzziness zone 16.

In the case of such a scenario or result, the sensing point corresponds to the position indication or the position vector $\hat{x}_g$ with an underlying basic probability about the affiliation to the object, and furthermore, the isolated sensing point with the position vector $\hat{x}_i$ can be assessed as a real sensing point for the object. In this case, the basic probability is formed by a difference measurement or a reference sensing point that is actually affiliated to the object.

In this case too, the term $v^T S^{-1} v < g$ can then in turn be set for the Mahalanobis distance d already cited above, with the difference vector v that is obtained from the difference between $\hat{x}_i - \hat{x}_g$. On the stipulation that the spatial fuzziness or positional fuzziness is meant to be no more than the basic probability or the difference measurement and therefore the reference sensing point, the gate value 1 is defined.

This results in $$v^T S^{-1} v = g = \frac{\Delta x^2}{\sigma_x^2} + \frac{\Delta y^2}{\sigma_y^2} \text{ or } \frac{\Delta d^2}{\sigma_d^2} + \frac{\Delta \alpha^2}{\sigma_\alpha^2}$$

By way of example, this gate value is achieved for $\Delta y=0$, if $\Delta x<\sigma$. This allows particularly simple interpretation of the statement about the spatial uncertainty, and it is particularly also possible for the two sensor devices, the ultrasonic detection device 4 and the front camera 10 and/or the rear camera 11 to check themselves in the face of the same conditions with regard to the positional fuzziness of the sensed sensing points and therefore the assessment of the affiliation to an object.

This also means that if the difference vector becomes greater, the inaccuracy of a sensing point becomes greater and therefore the positional fuzziness must also become greater in order to be able to make an association with the basic probability and therefore the reference measurement. The association with the basic probability is rated as a genuine positive event in this case. As a result, there is preferably provision for a maximum permitted point inaccuracy to be defined and hence also for the spatial uncertainty to be defined at a maximum value.

S is a matrix, that indicates the sum of the spatial fuzzinesses and therefore of the positional fuzzinesses of the two sensing points. The difference vector v is a vector that indicates the difference between the sensing points to be assessed. In this case, the value of the matrix S is important for the gate value g.

If a sensor fusion is performed and therefore the assessment of sensing points from two different sensor devices is meant to take place and, in this regard, a comparison is also meant to take place, then particularly the Mahalanobis distance between the two sensing points from these two different sensor devices, as have been sensed in each case, is checked. Hence, the aforementioned approach is also advantageous for such a check, since the sensor devices can therefore be appraised using an identical assessment option. This allows identical scaling of the information obtained.

Figure 4:
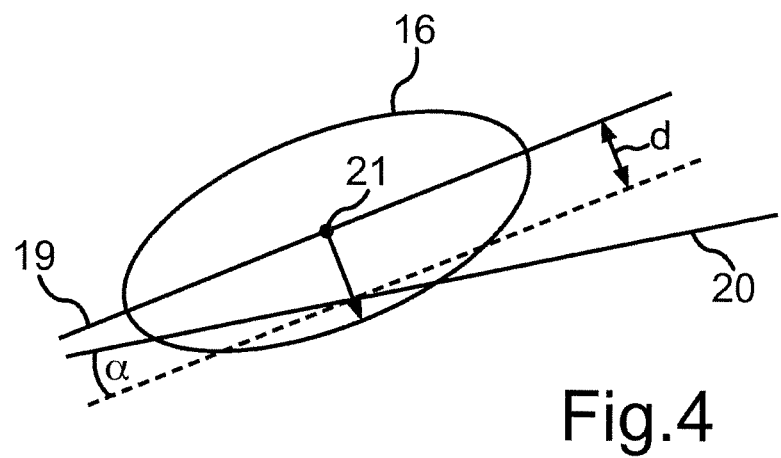
FIG. 4 shows a further exemplary depiction of a further positional fuzziness scenario.

FIG. 4 shows a further exemplary embodiment, in which there are likewise sensing points in this case in the form not of isolated sensing points but rather linear sensing points 19 and 20. These are oriented at the angle $\alpha$ in relation to one another and are at a distance d. In this development, a difference vector v is then obtained as follows:

$$\hat{v} = \begin{pmatrix} d \\ \Delta \alpha \end{pmatrix}$$

In this embodiment, the spatial uncertainty is a two-dimensionally elliptical fuzziness zone, in the form of the overall fuzziness zone 16 around a defined point 21 situated on the line 19.

The invention claimed is:

1. The method for assessing an affiliation of a sensing point to an object in a surrounding area of a motor vehicle, comprising:
sensing the sensing point using a first sensor device of the motor vehicle; and
forming a fuzziness zone characterizing a positional fuzziness of the sensing point around the sensing point, forming an overall fuzziness zone based on the fuzziness zone of the sensing point; and
assessing whether the sensing point is affiliated to the object by taking into consideration at least one position of a further sensing point,
wherein the sensing point is determined to be affiliated to the object when the sensing point and the further sensing point are both situated in an area formed by the overall fuzziness zone, and
wherein the further sensing point is a reference point that is affiliated to the object,
wherein the fuzziness zone of the sensing point is produced as a two-dimensionally elliptical fuzziness zone,
wherein the two-dimensionally elliptical fuzziness zone indicates a weighting for a probability of the positional fuzziness for each direction of axes of the elliptical fuzziness zone.

2. The method according to claim 1, wherein a further fuzziness zone is formed around the further sensing point, and the overall fuzziness zone is formed by summing the fuzziness zone and the further fuzziness zone to increase a statement probability of the detected object.

3. The method according to claim 2, wherein the further fuzziness zone is produced as a two-dimensionally elliptical fuzziness zone.

4. The method according to claim 1, wherein the fuzziness zone and/or a further fuzziness zone produced around the further sensing point have their shape adapted on the basis of the location of the sensing points in relation to the overall fuzziness zone.

5. The method according to claim 4, wherein the adaptation is performed according to at least one first affiliation statement.

6. The method according to claim 4, wherein the affiliation of the sensing point to the object is assessed by virtue of a covariance matrix being formed on the basis of a distance between the sensing points and a Mahalanobis distance being produced on the basis of the covariance matrix.

7. The method according to claim 6, wherein a check is performed to determine whether the Mahalanobis distance is less than a prescribed gate value of 1, and, in the event of the Mahalanobis distance being less than the prescribed gate value, and the two sensing points being situated within the overall fuzziness zone, the sensing point is assessed as being affiliated to the object.

8. The method according to claim 7, wherein at least one fuzziness zone has its shape and/or orientation adapted if the Mahalanobis distance of an affiliation assessment is greater than the prescribed gate value.

9. The method according to claim 8, wherein at least one fuzziness zone is adapted if, in one assessment scenario, a number N of affiliation assessments for sensing points with respect to an object is greater than a threshold value, which number N has respectively been assessed with a Mahalanobis distance greater than the prescribed gate value.

10. The method according to claim 7, wherein the surrounding area is sensed using a second sensor device that is functionally different from the first sensor device, and sensing points of the second sensor device are assessed on the basis of the affiliation assessment taken as a basis for the first sensor device.

11. The method according to claim 10, wherein the affiliation assessments of the two sensor devices are compared and a statement accuracy of at least one sensor device is rated on the basis thereof.

12. The method according to claim 6, wherein a check is performed to determine whether the Mahalanobis distance is less than a prescribed gate value of 1, and, in the event of the Mahalanobis distance being less than the prescribed gate value, the covariance matrix is reduced.

13. The method according to claim 1, wherein the sensing point and the further sensing point are associated to form a fused sensing point if the two sensing points are situated in the area of the overall fuzziness zone.

14. The method according to claim 1, wherein the object characterized by affiliated sensing points is entered into a map of the surrounding area.

15. A driver assistance system having at least one first sensor device and an evaluation unit that is configured to carry out the method according to claim 1.

* * * * *